(12) United States Patent
Taikou et al.

(10) Patent No.: US 10,792,994 B2
(45) Date of Patent: Oct. 6, 2020

(54) IN-WHEEL MOTOR DRIVE DEVICE AND CONNECTION STRUCTURE BETWEEN IN-WHEEL MOTOR DRIVE DEVICE AND WHEEL

(71) Applicant: NTN CORPORATION, Osaka (JP)

(72) Inventors: Shinya Taikou, Shizuoka (JP); Shiro Tamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 63 days.

(21) Appl. No.: 16/320,536

(22) PCT Filed: Jul. 3, 2017

(86) PCT No.: PCT/JP2017/024331
§ 371 (c)(1),
(2) Date: Jan. 25, 2019

(87) PCT Pub. No.: WO2018/025550
PCT Pub. Date: Feb. 8, 2018

(65) Prior Publication Data
US 2019/0273412 A1    Sep. 5, 2019

(30) Foreign Application Priority Data
Aug. 1, 2016   (JP) .................................. 2016-151315

(51) Int. Cl.
| | |
|---|---|
| *B60K 7/00* | (2006.01) |
| *H02K 5/22* | (2006.01) |
| *B60B 37/10* | (2006.01) |
| *H02K 5/16* | (2006.01) |
| *H02K 7/18* | (2006.01) |

(52) U.S. Cl.
CPC ............... *B60K 7/00* (2013.01); *B60B 37/10* (2013.01); *B60K 7/0007* (2013.01); *H02K 5/16* (2013.01); *H02K 5/22* (2013.01); *H02K 7/1846* (2013.01)

(58) Field of Classification Search
CPC . B60K 7/00; B60K 7/007; H02K 5/22; H02K 5/16; H02K 7/1846; B60B 37/10
USPC ....................................................... 180/65.51
See application file for complete search history.

(56) References Cited

U.S. PATENT DOCUMENTS 5,048,626 A * 9/1991 Strehler ............... B60K 7/0007
180/19.2
9,090,142 B2 * 7/2015 Lee ...................... B60K 7/0007

FOREIGN PATENT DOCUMENTS

| JP | 5-116546 | 5/1993 |
| JP | 10-304645 | 11/1998 |

(Continued)

Primary Examiner — John D Walters
(74) Attorney, Agent, or Firm — Clark & Brody LP

(57) ABSTRACT

A casing (43) of an in-wheel motor drive device (10) includes a tubular body first casing (43g) disposed on one side in an axial (O) direction and a tubular body second casing (43a) disposed on the other side in the axial direction. Each of the body first casing and the body second casing has an annular abutting surface (43j) so that the annular abutting surfaces of the body first casing and the body second casing abut on each other in the axial direction. A hub carrier (18) has at its tip end a connecting portion (82s) for rotatable connection to a vehicle body-side member (81). The connecting portion is disposed so as not to overlap the abutting surfaces in the axial direction and so as to overlap the body first casing or the body second casing in the axial direction.

8 Claims, 7 Drawing Sheets

(56) References Cited

FOREIGN PATENT DOCUMENTS

| JP | 2015-073370 | 4/2015 |
| WO | 2015/011976 | 1/2015 |

* cited by examiner

OUTSIDE IN LATERAL DIRECTION OF VEHICLE ← → INSIDE IN LATERAL DIRECTION OF VEHICLE

FRONT OF VEHICLE

OUTSIDE IN LATERAL DIRECTION OF VEHICLE ← → INSIDE IN LATERAL DIRECTION OF VEHICLE

IN-WHEEL MOTOR DRIVE DEVICE AND CONNECTION STRUCTURE BETWEEN IN-WHEEL MOTOR DRIVE DEVICE AND WHEEL

TECHNICAL FIELD

The present invention relates to in-wheel motor drive devices that are mounted in internal space regions of wheels to drive the wheels and more particularly relates to casings.

BACKGROUND ART

For example, an in-wheel motor described in Japanese Unexamined Patent Publication No. 2015-73370 (Patent Literature 1) is conventionally known as an in-wheel motor that is mounted inside a wheel to drive the wheel. A drive unit described in Patent Literature 1 includes: a wheel hub shaft, a hub bearing, and an outer ring which are disposed on one side in the axial direction of a wheel; a reduction gear case disposed in the middle in the axial direction of the wheel; and an electric motor case disposed on the other side in the axial direction of the wheel. The reduction gear case and the electric motor case are joined along a joint surface. The end of the reduction gear case which includes the joint surface is thicker than the remaining portion thereof. The same applies to the electric motor case.

A knuckle arm is located between the outer ring and the reduction gear case. The knuckle arm extends upward and downward. The upper end of the knuckle arm is connected to an upper arm via an upper pivot, and the lower end of the knuckle arm is connected to a lower arm via a lower pivot.

CITATION LIST

Patent Literatures

Patent Literature 1: Japanese Unexamined Patent Publication No. 2015-73370

SUMMARY OF INVENTION

Technical Problem

The inventors found that such a conventional drive unit has room for further improvement. The case joint surface is located in the axial direction of the wheel so that the axial position of the case joint surface overlaps that of the lower pivot. The reduction gear case and the lower pivot are disposed in a small space, namely in an internal space region of the wheel. The reduction gear case and the electric motor case therefore cannot have a sufficient radial dimension. Accordingly, a large diameter gear cannot be placed in the reduction gear case to increase the reduction ratio, or the outside diameter of the electric motor cannot be increased to increase electric motor output.

At least one of the reduction gear case and the lower pivot can be disposed outside the wheel in order to make the radial dimension of the reduction gear case larger than in the technique of Patent Document 1. However, this is disadvantageous because the reduction gear case protrudes from the wheel or because the lower pivot protrudes from the wheel. Since the lower pivot forms the lower end of a steering shaft (king pin), the king pin is located farther away from the wheel center. The distance from the wheel center to the king pin therefore increases, which impairs steering stability of the wheel. For example, when the wheel passes over a step, the moment about the king pin is applied to the wheel, which results in undesired steering of the wheel.

In view of the above, it is an object of the present invention to provide an in-wheel motor drive device in which an in-wheel motor is connected to a suspension device at a position closer to the axis of a wheel than in conventional examples so that steering stability of the wheel can be improved or the diameter of the in-wheel motor can be increased.

Solution to Problem

In order to achieve the above object, an in-wheel motor drive device according to the present invention includes: a wheel hub bearing unit having an outer ring that rotates with a wheel, an inner fixing member disposed inside the outer ring, and a plurality of rolling elements disposed in annular clearance between the outer ring and the inner fixing member; a motor unit that drives the outer ring; and a hub carrier coupled to the inner fixing member. A casing accommodating a drive transmission path from the motor unit to the outer ring includes a tubular body first casing disposed on one side in an axial direction of the wheel hub bearing unit and a tubular body second casing disposed on the other side in the axial direction of the wheel hub bearing unit. Each of the body first casing and the body second casing has an annular abutting surface so that the annular abutting surfaces of the body first casing and the body second casing abut on each other in the axial direction. The hub carrier extends so as to protrude in a form of an arm from an end of the inner fixing member which is located on the other side in the axial direction and to face at an interval an outer wall surface of the body second casing. The hub carrier has at its tip end a connecting portion for rotatable connection to a vehicle body-side member. The connecting portion is disposed so as not to overlap the abutting surfaces in the axial direction of the wheel hub bearing unit and so as to overlap the body first casing or the body second casing in the axial direction of the wheel hub bearing unit.

According to this invention, the connecting portion is located on the one side or the other side in the axial direction with respect to the abutting surfaces. The connecting portion can therefore be located closer to the axis of the wheel hub bearing unit, and sufficient space for the vehicle body-side member can be provided in an internal space region of a road wheel. Alternatively, the radial dimension of the casing about the axis can be increased, so that a large diameter gear can be disposed in the casing and the rotational speed of the motor unit can be sufficiently reduced by the large diameter gear and transmitted to the outer ring. The vehicle body-side member refers to a member attached to a vehicle body as viewed from an illustrated member that is herein the hub carrier. For example, the vehicle body-side member is a suspension device.

The casing accommodating the drive transmission path from the motor unit to the outer ring refers to a casing that serves as an outer shell of the in-wheel motor drive device. Such a casing is not particularly limited, but for example, refers to a predetermined casing region of a motor casing serving as an outer shell of only the motor unit, a casing member serving as an outer shell of only a reduction gear unit, or a casing member that is continuous from the motor unit to the reduction gear unit. In one embodiment of the present invention, the body first casing and/or the body second casing surrounds a gear coupled to the outer ring. According to this embodiment, the diameter of a gear coaxially disposed on the outer periphery of the outer ring can be made larger than in conventional examples and the rotational speed of the motor unit can be sufficiently reduced by the gear and transmitted to the outer ring.

In a preferred embodiment of the invention, the connecting portion is a ball joint. According to this embodiment, the connecting portion can change the direction of the in-wheel motor drive device to any direction. The in-wheel motor drive device can therefore be steered in a lateral direction of the vehicle with the ball joint serving as the center of rotation and can swing in a vertical direction. In another embodiment, the connecting portion may be a portion that non-rotatably fixes the hub carrier to the vehicle body-side member, such as a group of internally threaded holes. Alternatively, in still another embodiment, the connecting portion may be a pivot and may couple the hub carrier to the vehicle body-side member so that the hub carrier is rotatable about a predetermined axis.

In another preferred embodiment of the invention, a first brim portion protruding outward is formed at an end of the body first casing which is located on the other side in the axial direction, a second brim portion protruding outward is formed at an end of the body second casing which is located on the one side in the axial direction, and the first brim portion and the second brim portion abut on each other in the axial direction. According to this embodiment, the abutting surface is formed on each brim portion, whereby wide abutting surfaces can be provided. Sealing performance of the abutting surfaces is therefore improved. In a further embodiment, the brim portions may not be formed so that the lateral dimension of the abutting surfaces is equal to the thickness of the casing. The first brim portion and the second brim portion may be fitted together like spigot and socket joint.

In one embodiment of the present invention, the connecting portion does not overlap the first brim portion and the second brim portion in the axial direction of the wheel hub bearing unit, and the connecting portion is disposed so as to overlap the first brim portion and the second brim portion as viewed in the axial direction of the wheel hub bearing unit. According to this embodiment, the connecting portion is disposed on the one side or the other side in the axial direction with respect to the first and second brim portions. Accordingly, even if the brim portions are formed, interference between the brim portions and the connecting portion can be avoided and both the brim portions and the connecting portion can be appropriately disposed. Moreover, the gap between the connecting portion and an outer wall surface of the casing which faces the connecting portion can be reduced. In another embodiment, the connecting portion may be disposed so as to overlap the first brim portion or the second brim portion in the axial direction of the wheel hub bearing unit.

In one embodiment of the present invention, protruding portions are formed on an outer wall surface of the body first casing and the outer wall surface of the body second casing, and the protruding portions are paired with the abutting surfaces therebetween, the protruding portions of each pair are connected and fixed to each other by a connecting element, and the protruding portions are disposed so as not to overlap the connecting portion as viewed in the axial direction of the wheel hub bearing unit. According to this embodiment, even if the pairs of protruding portions are formed on the outer wall surface of the casing, the gap between the connecting portion and the outer wall surface of the casing can be made smaller than in conventional examples, and sufficient space can be provided between the connecting portion and a rim portion of the wheel.

In one embodiment of the present invention, the protruding portions are offset in the axial direction of the wheel hub bearing unit so as not to overlap the connecting portion in the axial direction of the wheel hub bearing unit. In this embodiment, the protruding portions are disposed on the one side or the other side in the axial direction with respect to the connecting portion.

A connection structure between an in-wheel motor drive device and a wheel according to the present invention includes: the above in-wheel motor drive device; and a road wheel having a rim portion and a spoke portion with a central part of the spoke portion being connected and fixed to the outer ring. At least a part of the connecting portion is accommodated in an internal space region of the road wheel which is defined by the rim portion and the spoke portion. According to this invention, the connecting portion can be located closer to a wheel center of the wheel, whereby steering stability of the wheel is improved.

Advantageous Effects of Invention

As described above, according to the present invention, the in-wheel motor is connected to the vehicle body-side member at a position closer to the axis of the wheel than in conventional examples, whereby steering stability of the wheel can be improved. Moreover, the outside diameter dimension of the in-wheel motor drive device can be increased. The reduction ratio of a reduction gear mechanism and the output of the motor unit can therefore be increased.

DESCRIPTION OF EMBODIMENTS

Figure 1:
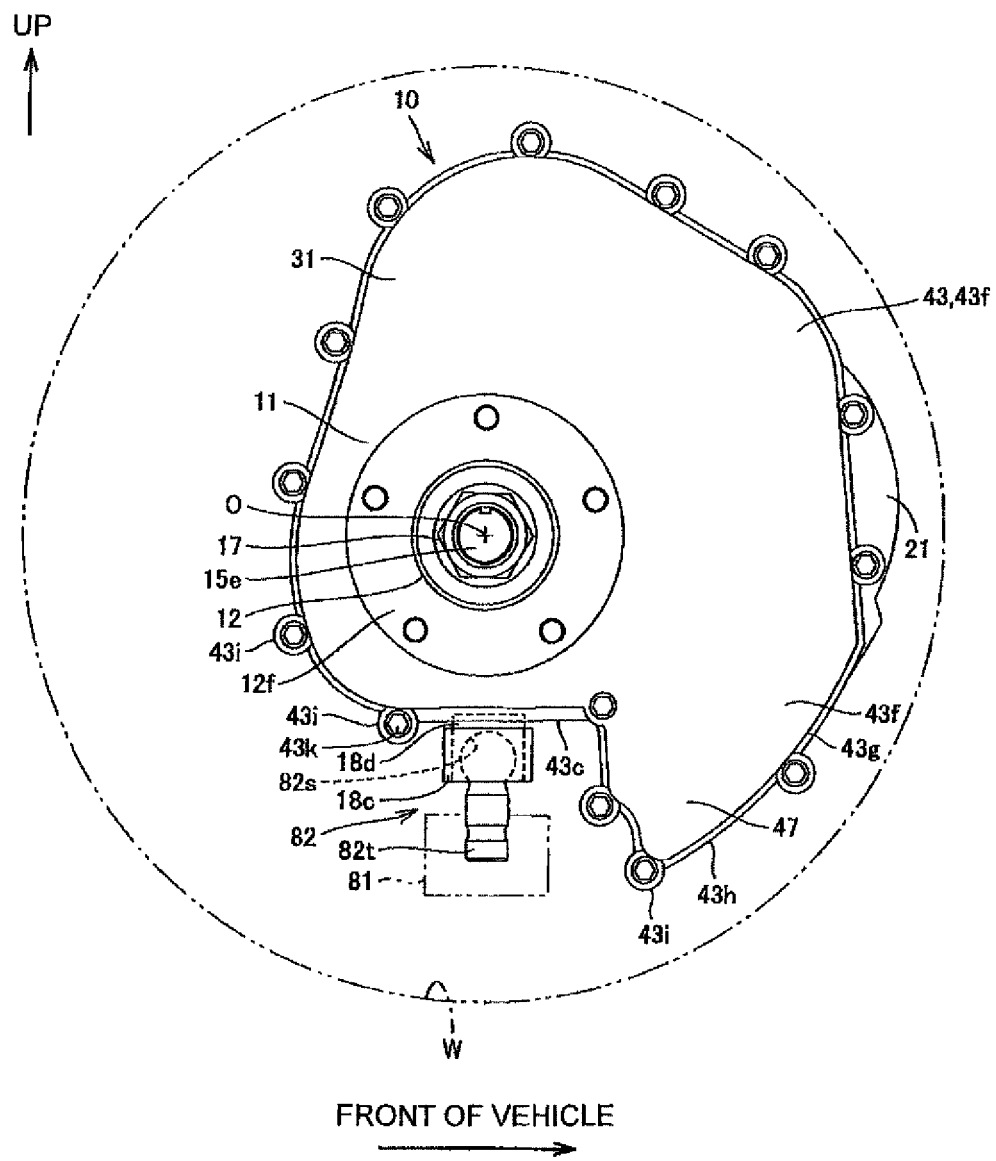
FIG. 1 is a schematic view showing an in-wheel motor drive device according to an embodiment of the present invention as viewed from outside in the lateral direction of a vehicle.
Figure 2:
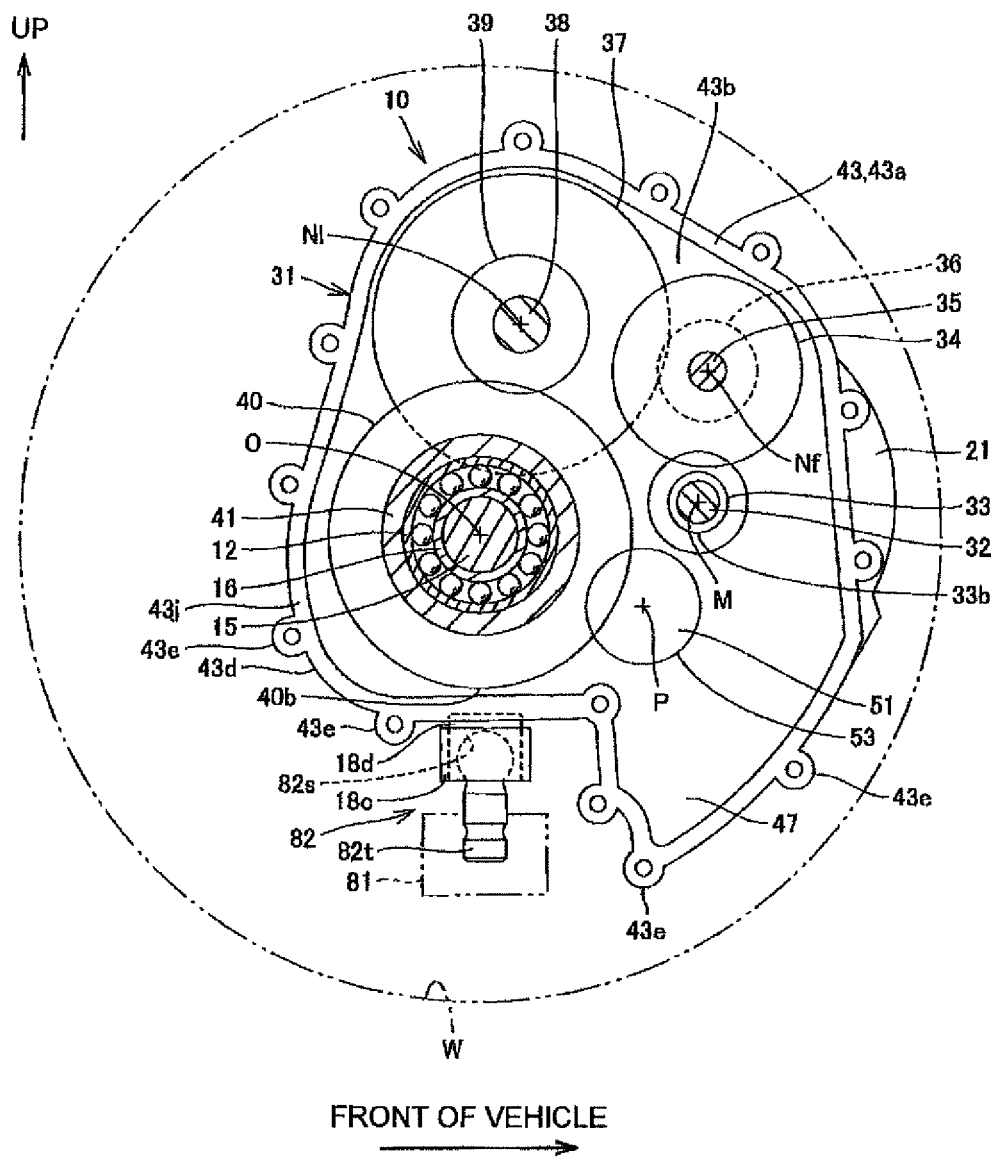
FIG. 2 is a transverse section schematically showing the in-wheel motor drive device of the embodiment.
Figure 3:
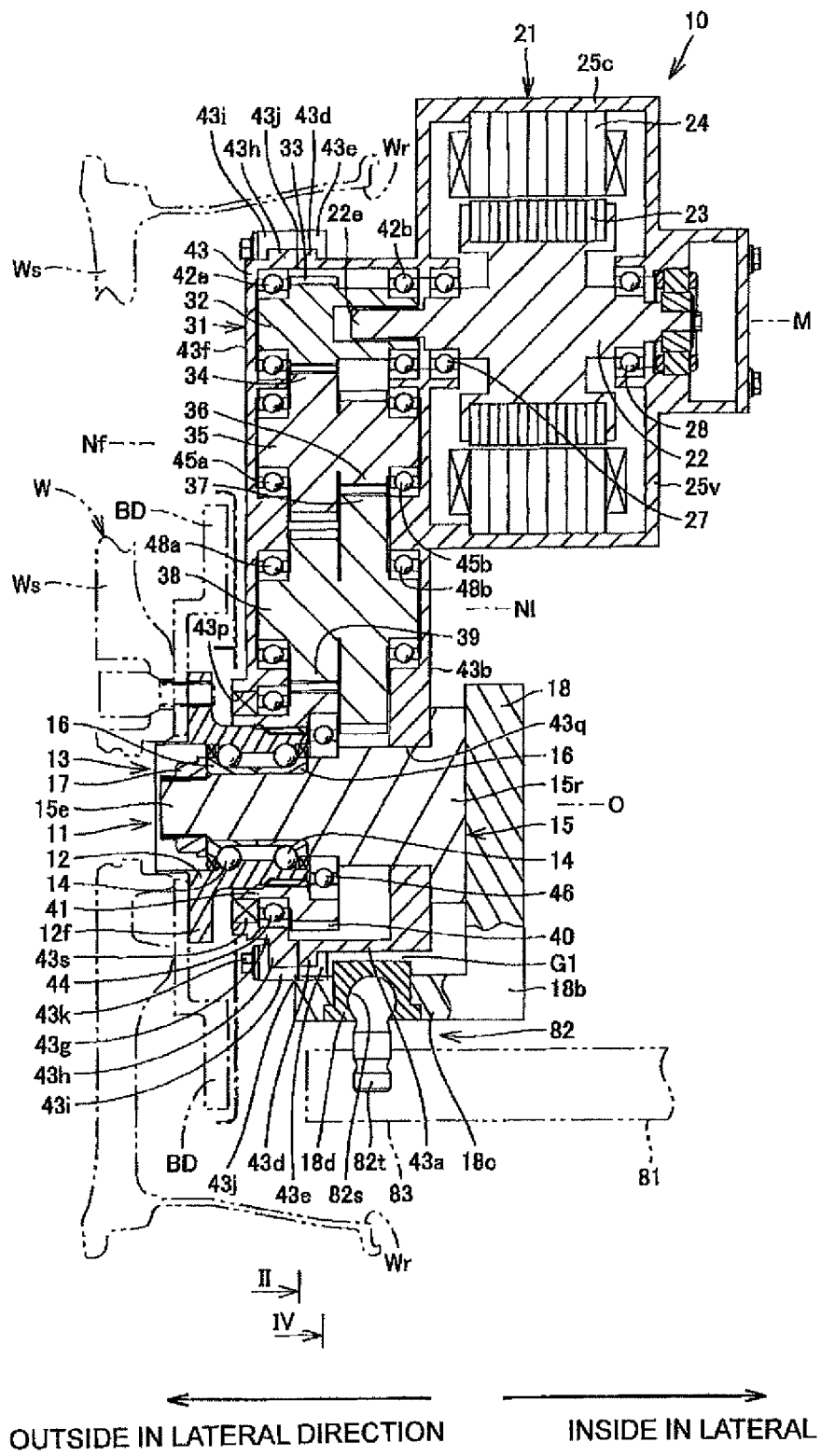
FIG. 3 is a developed section schematically showing the in-wheel motor drive device of the embodiment.
Figure 4:
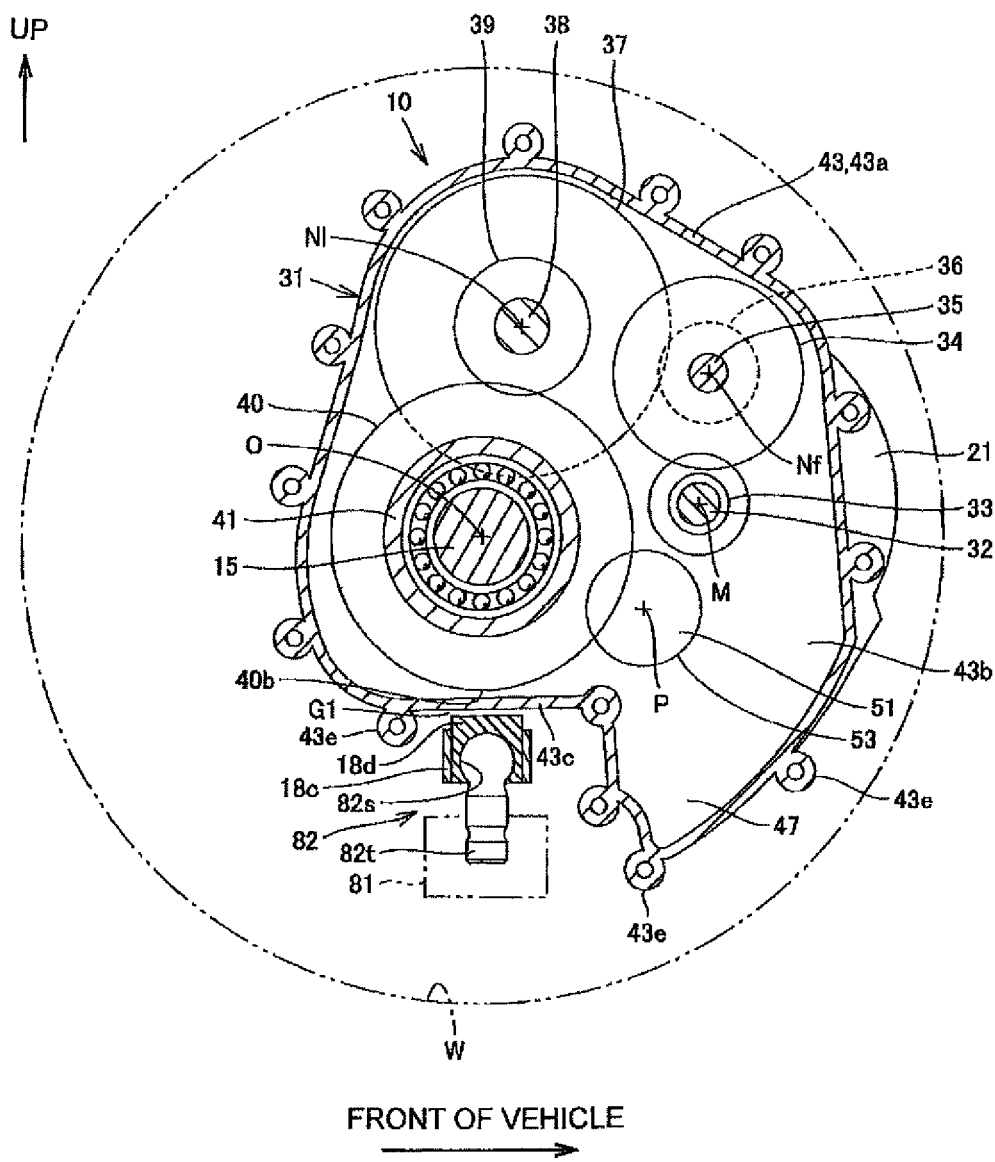
FIG. 4 is a transverse section schematically showing the in-wheel motor drive device of the embodiment.

An embodiment of the present invention will be described in detail below with reference to the accompanying drawings. FIG. 1 is a schematic view showing an in-wheel motor drive device according to an embodiment of the present invention. FIGS. 2 and 4 are transverse sections schematically showing the in-wheel motor drive device of the embodiment. FIGS. 1, 2, and 4 show the in-wheel motor drive device as viewed from outside in the lateral direction of a vehicle. In FIGS. 2 and 4, each gear in a reduction gear unit is shown by an addendum circle and individual teeth are not shown. FIG. 3 is a developed section schematically showing the in-wheel motor drive device of the embodiment. The cutting plane shown in FIG. 3 is a developed plane connecting a plane including an axis M and an axis Nf shown in FIG. 2, a plane including the axis Nf and an axis N1, and a plane including the axis N1 and an axis O in this order. In FIG. 3, the cutting plane in FIG. 2 is shown by II-II, and the cutting plane in FIG. 4 is shown by IV-IV.

An in-wheel motor drive device 10 includes a wheel hub bearing unit 11, a motor unit 21, and a reduction gear unit 31 that reduces the speed of rotation of the motor unit 21 to transmit the resultant rotation to the wheel hub bearing unit 11. The in-wheel motor drive device 10 is symmetrically disposed on both right and left sides in the lateral direction of an electrically powered vehicle (not shown) such as an electric vehicle or a hybrid vehicle. As shown in FIG. 3, the wheel hub bearing unit 11 is disposed on the outer side in the lateral direction of the vehicle, and the motor unit 21 is disposed on the inner side in the lateral direction of the vehicle.

The in-wheel motor drive device 10 is disposed in an internal space region of a road wheel W shown in phantom in FIG. 1, is connected to the center of the road wheel W shown in phantom in FIG. 3, and drives the road wheel W of a wheel.

Each in-wheel motor drive device 10 is connected to a vehicle body of the electrically powered vehicle via a suspension device. The suspension device includes a plurality of arm members, for example, a combination of a lower arm and an upper arm, a combination of a lower arm and an upper strut, a trailing arm, or other arm members. A lower arm 81 as the suspension device is shown in the figure. The lower arm 81 extends in the lateral direction of the vehicle and is disposed below the axis O. The in-wheel motor drive devices 10 allow the electrically powered vehicle to move at 0 to 180 km/h on public roads.

The motor unit 21 and the reduction gear unit 31 are not disposed coaxially with the wheel hub bearing unit 11, namely are not disposed about the axis O of the wheel hub bearing unit 11, as shown in FIGS. 1 and 2, but are offset from the axis O of the wheel hub bearing unit 11, as shown in FIG. 3. That is, as described in detail later, the in-wheel motor drive device 10 includes a portion facing forward of the electrically powered vehicle, a portion facing rearward of the electrically powered vehicle, a portion disposed in an upper part, and a portion disposed in a lower part.

The wheel hub bearing unit 11 has an outer ring 12 that serves as a wheel hub ring coupled to the road wheel W as shown in FIG. 3, an inner fixing member 13 passed through a central hole of the outer ring 12, and a plurality of rolling elements 14 arranged in annular clearance between the outer ring 12 and the inner fixing member 13, and the wheel hub bearing unit 11 forms an axle. The inner fixing member 13 includes a non-rotary fixed shaft 15, a pair of inner races 16, and a retaining nut 17. The fixed shaft 15 has a larger diameter in its root part 15r than in its tip end 15e. The inner races 16 are fitted on the fixed shaft 15 between the root part 15r and the tip end 15e. The retaining nut 17 is screwed on the tip end 15e of the fixed shaft 15 to fix the inner races 16 between the retaining nut 17 and the root part 15r.

The fixed shaft 15 extends along the axis O and extends through a body casing 43 that serves as an outer shell of the wheel hub bearing unit 11 and the reduction gear unit 31. The body casing 43 is a casing that serves as an outer shell of the in-wheel motor drive device 10. Specifically, as shown in FIG. 1, the body casing 43 includes a large part of an end face of the in-wheel motor drive device 10 which is located on the outer side in the lateral direction of the vehicle (hereinafter, this end face is sometimes referred to as the end face on one side in the direction of the axis O or the front face). As shown in FIG. 2, the body casing 43 extends along the entire circumference of the in-wheel motor drive device 10, and further includes a part of an end face of the in-wheel motor drive device 10 which is located on the inner side in the lateral direction of the vehicle (hereinafter, this end face is sometimes referred to as the end face on the other side in the direction of the axis O or the back face). The tip end 15e of the fixed shaft 15 extends through an opening 43p formed in a front portion 43f of the body casing 43 and protrudes outward in the lateral direction of the vehicle beyond the front portion 43f. The root part 15r of the fixed shaft 15 extends from a position located on the inner side in the lateral direction of the vehicle with respect to a back portion 43b and extends through an opening 43q formed in the back portion 43b of the body casing 43. The front portion 43f and the back portion 43b are casing wall portions that face each other at an interval in the direction of the axis O. A hub carrier 18 is attached and fixed to the root part 15r of the fixed shaft 15. The hub carrier 18 is located outside the body casing 43 and coupled to the suspension device and a tie rod. For example, the hub carrier 18 includes an arm portion 18b extending downward from the axis O and coupled to the lower arm 81, another arm portion extending upward from the axis O and coupled to a strut, not shown, and still another arm portion extending toward the rear of the vehicle from the axis O and coupled to the tie rod, not shown.

The rolling elements 14 are arranged in two rows separated in the direction of the axis O. The outer peripheral surface of the inner race 16 located on the one side in the direction of the axis O forms an inner raceway surface for the first row of the rolling elements 14 and faces a part of the inner peripheral surface of the outer ring 12 which is located on the one side in the direction of the axis O. The outer peripheral surface of the inner race 16 located on the other side in the direction of the axis O forms an inner raceway surface for the second row of the rolling elements 14 and faces a part of the inner peripheral surface of the outer ring 12 which is located on the other side in the direction of the axis O. In the following description, the outer side in the lateral direction of the vehicle (outboard side) is sometimes referred to as the one side in the axial direction, and the inner side in the lateral direction of the vehicle (inboard side) is sometimes referred to as the other side in the axial direction. The lateral direction in the plane of paper of FIG. 3 corresponds to the lateral direction of the vehicle. The inner peripheral surface of the outer ring 12 forms an outer raceway surface for the rolling elements 14.

The outer ring 12 has a flange portion 12f in its end located on the one side in the direction of the axis O. The flange portion 12f forms a coupling seat that is coaxially coupled to a brake disc BD and a spoke portion Ws of the road wheel W. The outer ring 12 is coupled at the flange portion 12f to the brake disc BD and the road wheel W and rotates with the road wheel W. In a modification, not shown, the flange portion 12f may be protruding portions formed at intervals in the circumferential direction and protruding radially outward.

As shown in FIG. 3, the motor unit 21 includes a motor rotary shaft 22, a rotor 23, a stator 24, and a motor casing 25c, which are arranged in this order from the axis M of the motor unit 21 toward the outside in the radial direction. The motor casing 25c has a tubular shape, and a motor casing cover 25v of the motor unit 21 covers an opening of the motor casing 25c which is located on the other side in the direction of the axis M. Since the motor unit 21 has a radially inner rotor and a radially outer stator which face each other with a radial gap therebetween, the motor unit 21 is a radial gap motor. However, the motor unit 21 may be of other types. For example, the motor unit 21 may be an axial gap motor, although not shown in the figures. The stator 24 is connected to a power line (not shown) extending from the vehicle body side. The motor unit 21 performs power running with electric power received from the vehicle body side through the power line or performs a regenerative operation in which the motor unit 21 converts rotation of the outer ring 12 to electric power and supplies the electric power to the vehicle body side via the power line.

The axis M, which is the center of rotation of the motor rotary shaft 22 and the rotor 23, extends parallel to the axis O of the wheel hub bearing unit 11. That is, the motor unit 21 is offset from the axis O of the wheel hub bearing unit 11. As shown in FIG. 3, a large part of the motor unit 21 except the tip end of the motor rotary shaft 22 does not overlap the inner fixing member 13 in the axial direction. The cylindrical motor casing 25*c* is coupled at its end located on the one side in the direction of the axis M to the back portion 43*b* of the body casing 43. The internal space of the motor casing 25*c* is partitioned by the back portion 43*b*. Such a casing wall portion has in its center a through hole extending along the axis M. An end 22*e* of the motor rotary shaft 22 is passed through the through hole. The cylindrical motor casing 25*c* is sealed at its end located on the other side in the direction of the axis X to the bowl-shaped motor casing cover 25*v*. Both ends of the motor rotary shaft 22 are rotatably supported by the motor casing 25*c* and the motor casing cover 25*v* via rolling bearings 27, 28. The motor unit 21 drives the outer ring 12 (i.e., the wheel) and a pump shaft 51 (FIG. 2).

The reduction gear unit 31 has an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the body casing 43. The input shaft 32 is a tubular member having a larger diameter than the end 22*e* of the motor rotary shaft 22 and extends along the axis M of the motor unit 21. The end 22*e* is placed in a central hole formed in an end of the input shaft 32 which is located on the other side in the direction of the axis M, so that the input shaft 32 is coaxially coupled to the motor rotary shaft 22. Both ends of the input shaft 32 are supported by the body casing 43 via rolling bearings 42*a*, 42*b*. The input gear 33 is an external gear having a smaller diameter than the motor unit 21 and is coaxially coupled to the input shaft 32. Specifically, the input gear 33 is integrally formed on the outer periphery of a middle part of the input shaft 32 in the direction of the axis M.

The output shaft 41 is a tubular member having a larger diameter than a cylindrical portion of the outer ring 12 and extends along the axis O of the wheel hub bearing unit 11. An end of the outer ring 12 which is located on the other side in the direction of the axis O is placed in a central hole formed in an end of the output shaft 41 which is located on the one side in the direction of the axial O, so that the output shaft 41 is coaxially coupled to the outer ring 12. The output gear 40 is an external gear and is coaxially coupled to the output shaft 41. Specifically, the output gear 40 is integrally formed on the outer periphery of an end of the output shaft 41 which is located on the other side in the direction of the axis M. Rolling bearings 44, 46 are disposed on both ends of the output shaft 41 in the direction of the axis O.

The rolling bearing 44 is disposed on the one side in the direction of the axis O with respect to the output gear 40 and is located between the outer peripheral surface of the output shaft 41 and the inner peripheral surface of the opening 43*p*. The rolling bearing 44 is disposed radially outside the outer ring 12 so as to overlap the outer ring 12 in the direction of the axis O.

The rolling bearing 46 is disposed on the other side in the direction of the axis O with respect to the outer ring 12 and is located between the inner peripheral surface of the output shaft 41 and the outer peripheral surface of the fixed shaft 15. The rolling bearing 46 is disposed radially inside the output gear 40 so as to overlap the output gear 40 in the direction of the axis O.

Regarding the position in the direction of the axis O, the rolling bearing 44 is disposed so as to overlap a region of the outer ring 12 which is located on the other side in the direction of the axis O, whereas the rolling bearing 46 is disposed on the other side in the direction of the axis O with respect to the outer ring 12 and does not overlap the outer ring 12. The rolling bearing 46 is disposed radially inside the teeth of the output gear 40 and the rolling bearing 46 overlaps the output gear 40 in the direction of the axis O.

The two intermediate shafts 35, 38 extend parallel to the input shaft 32 and the output shaft 41. That is, the reduction gear unit 31 is a four-parallel-shaft reduction gear unit. The axis O of the output shaft 41, the axis Nf of the intermediate shaft 35, the axis Nl of the intermediate shaft 38, and the axis M of the input shaft 32 extend parallel to each other, namely extend in the lateral direction of the vehicle.

The position of each axis in the longitudinal direction of each axis will be described. As shown in FIG. 2, the axis M of the input shaft 32 is located closer to the front of the vehicle than the axis O of the output shaft 41. The axis Nf of the intermediate shaft 35 is located closer to the front of the vehicle than the axis M of the input shaft 32. The axis Nl of the intermediate shaft 38 is located closer to the front of the vehicle than the axis O of the output shaft 41 and closer to the rear of the vehicle than the axis M of the input shaft 32. In a modification, not shown, the axis M of the input shaft 32, the axis Nf of the intermediate shaft 35, the axis Nl of the intermediate shaft 38, and the axis O of the output shaft 41 may be arranged in this order in the longitudinal direction of the vehicle. This order is also the order in which a driving force is transmitted.

The vertical position of each axis will be described. The input shaft 32 is disposed so as to overlap the output shaft 41 in the vertical direction. The axis Nf of the intermediate shaft 35 is located above the axis M of the input shaft 32. The axis Nl of the intermediate shaft 38 is located above the axis Nf of the intermediate shaft 35. The plurality of intermediate shafts 35, 38 need only be disposed above the input shaft 32 and the output shaft 41. The intermediate shaft 38 may be disposed above the intermediate shaft 35 as shown in FIG. 2, or in a modification, not shown, the intermediate shaft 35 may be disposed above the intermediate shaft 38. In a modification, not shown, the output shaft 41 may be disposed above the input shaft 32.

The intermediate gear 34 and the intermediate gear 36 are external gears, and as shown in FIG. 3, are coaxially coupled to a middle region of the intermediate shaft 35 in the direction of the axis Nf. Both ends of the intermediate shaft 35 are supported by the wall-like body casing 43 via rolling bearings 45*a*, 45*b*. The intermediate gear 37 and the intermediate gear 39 are external gears and are coaxially coupled to a middle region of the intermediate shaft 38 in the direction of the axis Nl. Both ends of the intermediate shaft 38 are supported by the wall-like body casing 43 via rolling bearings 48*a*, 48*b*.

The body casing 43 serves as an outer shell of the reduction gear unit 31 and the wheel hub bearing unit 11, has a tubular shape, and surrounds the axes O, Nf, Nl, M as shown in FIG. 2. As shown in FIG. 3, the body casing 43 is accommodated in the internal space region of the road wheel W. The internal space region of the road wheel W is defined by the inner peripheral surface of a rim portion Wr and the spoke portion Ws coupled to an end of the rim portion Wr which is located on the one side in the direction of the axis O. The wheel hub bearing unit 11, the reduction gear unit 31, and a region of the motor unit 21 which is located on the one side in the axial direction are accommodated in the internal space region of the road wheel W. A region of the motor unit 21 which is located on the other side in the axial direction protrudes from the road wheel W toward the other side in the axial direction. The road wheel W thus accommodates a large part of the in-wheel motor drive device 10.

Referring to FIG. 2, the body casing 43 has a portion 43c located directly below the axis O and a portion located away from the axis O of the output gear 40 in the longitudinal direction of the vehicle, specifically located directly below the axis M of the input gear 33, and protruding downward. This protruding portion forms an oil tank 47 and is located below the portion 43c located directly below the axis O.

The body casing 43 has a tubular shape and, as shown in FIG. 3, accommodates the input shaft 32, the input gear 33, the intermediate gear 34, the intermediate shaft 35, the intermediate gear 36, the intermediate gear 37, the intermediate shaft 38, the intermediate gear 39, the output gear 40, the output shaft 41, and a middle part of the wheel hub bearing unit 11 in the direction of the axis O. Lubricating oil is sealed in the body casing 43, and the reduction gear unit 31 is lubricated. The input gear 33, the intermediate gear 34, the intermediate gear 36, the intermediate gear 37, the intermediate gear 39, and the output gear 40 are helical gears.

The body casing 43 has a tubular portion including the portion 43c located directly below the axis O and the oil tank 47 as shown in FIG. 2 and surrounding the group of gears 33, 34, 36, 37, 39, 40, the substantially flat front portion 43f covering the one side in the axial direction of a tubular portion of the reduction gear unit 31 as shown in FIG. 3, and the substantially flat back portion 43b covering the other side in the axial direction of the tubular portion of the reduction gear unit 31. The back portion 43b is coupled to the motor casing 25c. The back portion 43b is also coupled to the fixed shaft 15.

The front portion 43f has the opening 43p through which the outer ring 12 extends. A sealing material 43s is disposed in annular clearance between the opening 43p and the output shaft 41. The sealing material 43s is disposed on the one side in the direction of the axis O with respect to the rolling bearing 44 and seals the annular clearance. The outer ring 12, which is a rotary element, is accommodated, except for its end located on the one side in the direction of the axis O, in the body casing 43.

The input gear 33 having a smaller diameter and the intermediate gear 34 having a larger diameter are disposed on the one side in the axial direction (on the flange portion 12f side) of the reduction gear unit 31 and mesh with each other. The intermediate gear 36 having a smaller diameter and the intermediate gear 37 having a larger diameter are disposed on the other side in the axial direction (on the motor unit 21 side) of the reduction gear unit 31 and mesh with each other. The intermediate gear 39 having a smaller diameter and the output gear 40 having a larger diameter are disposed on the one side in the axial direction (on the flange portion 12f side) of the reduction gear unit 31 and mesh with each other. The input gear 33, the plurality of intermediate gears 34, 36, 37, 39, and the output gear 40 thus mesh with each other and form a drive transmission path from the input gear 33 through the plurality of intermediate gears 34, 36, 37, 39 to the output gear 40. As the smaller diameter drive gears and the larger diameter driven gears mesh with each other as described above, rotation of the input shaft 32 is reduced in speed by the intermediate shaft 35, rotation of the intermediate shaft 35 is reduced in speed by the intermediate shaft 38, and rotation of the intermediate shaft 38 is reduced in speed by the output shaft 41. The reduction gear unit 31 thus has a sufficient reduction ratio. Of the plurality of intermediate gears, the intermediate gear 34 is the first intermediate gear located on the input side of the drive transmission path. Of the plurality of intermediate gears, the intermediate gear 39 is the last intermediate gear located on the output side of the drive transmission path.

As shown in FIG. 2, the output shaft 41, the intermediate shaft 38, and the input shaft 32 are arranged in this order so as to be spaced apart from each other in the longitudinal direction of the vehicle. The intermediate shaft 35 and the intermediate shaft 38 are disposed above the input shaft 32 and the output shaft 41. According to the first embodiment, the intermediate shafts can be disposed above the outer ring 12 that serves as a wheel hub, so that space where the oil tank 47 is disposed can be provided below the outer ring 12 and space that accommodates a ball joint 82 of the suspension device can be provided directly below the outer ring 12. This allows a steering axis passing through the ball joint 82 and extending in the vertical direction to cross the wheel hub bearing unit 11, whereby the road wheel W and the in-wheel motor drive device 10 can be suitably steered about the steering axis.

As shown in FIG. 2, the body casing 43 further accommodates the pump shaft 51. An axis P of the pump shaft 51 extends parallel to the axis O of the output shaft 41. The pump shaft 51 is separated from the output shaft 41 in the longitudinal direction of the vehicle as shown in FIG. 2, is rotatably supported at its both ends in the direction of the axis P via rolling bearings, not shown, and is coaxially coupled to a pump gear 53. The pump gear 53 is an external gear and is also a helical gear and meshes with the output gear 40. The output gear 40 drives the pump shaft 51.

An oil pump, not shown, is disposed at an end of the pump shaft 51 in the direction of the axis P. As the pump shaft 51 is driven by the output gear 40, the oil pump, not shown, sucks lubricating oil in the oil tank 47 and pumps up the sucked lubricating oil to supply the lubricating oil to the input gear 33, the intermediate gears 34, 36, 37, 39, and the output gear 40 from above these gears. The lubricating oil thus pumped up is also injected into the motor unit 21. The motor unit 21 and the reduction gear unit 31 are thus lubricated and cooled.

Referring to FIG. 2, the pump shaft 51 of the present embodiment is disposed below the input shaft 32, and the oil tank 47 is disposed below the pump shaft 51. For example, the oil pump is a cycloidal pump disposed substantially coaxially with the pump shaft 51 and pumps up the lubricating oil stored in the oil tank 47 to directly above the oil tank 47. The pump shaft 51 and the oil tank 47 are disposed closer to the front of the vehicle than the output shaft 41. When the road wheel W is driven by the in-wheel motor drive device 10 to move the electrically powered vehicle, the oil tank 47 is subjected to running wind from ahead of the vehicle and is thus cooled by air.

Next, the body casing 43 will be described in detail.

As shown in FIG. 3, the body casing 43 includes a tubular body first casing 43g disposed on the one side in the direction of the axis O of the wheel hub bearing unit 11, and a tubular body second casing 43a disposed on the other side in the direction of the axis O of the wheel hub bearing unit 11. The body first casing 43g is disposed on the one side in the direction of the axis O, and the body second casing 43a is disposed on the other side in the direction of the axis O, and the body first casing 43g and the body second casing 43a are coupled in the direction of the axis O. The body casing 43 serves as an outer shell of the reduction gear unit 31.

The body first casing 43g and the body second casing 43a of the body casing 43 are made of the same material. Unlike mere covers made of a resin, these casing members have sufficient rigidity. The body first casing 43g and the body second casing 43a are therefore made of a metal, and are preferably made of a light metal mainly comprised of aluminum in order to achieve reduction in weight of the in-wheel motor drive device 10.

The body first casing 43g is coupled at its end on the one side in the direction of the axis O to the plate-like front portion 43f and has an annular abutting surface 43j at its end on the other side in the direction of the axis O. The body second casing 43a is coupled at its end on the other side in the direction of the axis O to the back portion 43b and has an annular abutting surface 43j at its end on the one side in the direction of the axis O. Both abutting surfaces 43j are flat surfaces and abut on each other in the direction of the axial O. The abutting surfaces 43j have the same shape, but may have slightly different shapes. The body first casing 43g and the front portion 43f of the body casing 43 are made of the same material. The body second casing 43a, the rear part 43b, and the motor casing 25c are made of the same material.

The body first casing 43g has at its end on the other side in the direction of the axis O a brim portion 43h (sometimes referred to as the first brim portion) protruding toward the outside of the body casing 43. Similarly, the body second casing 43a has at its end on the one side in the direction of the axis O a brim portion 43d (sometimes referred to as the second brim portion) protruding toward the outside of the body casing 43. The brim portions 43d, 43h are flush with the abutting surfaces 43j, and the abutting surfaces 43j have a lateral dimension larger than the wall thickness of the body casing 43.

FIG. 2 shows the body casing 43 divided along the abutting surfaces 43j and shows the entire abutting surface 43j and the entire brim portion 43d. FIG. 4 shows the body second casing 43a cut along a cutting plane parallel to the abutting surfaces 43j and shows in section the thickness of the body second casing 43a. The brim portions 43d, 43h extend along the entire periphery of the tubular body casing 43. The flat abutting surfaces 43j are also formed on the brim portions 43h, 43d. The lateral direction of the abutting surface 43j shown in FIG. 2 is therefore larger than the thickness of the body second casing 43a shown in FIG. 4.

As shown in FIG. 4, a plurality of gears are disposed in the internal space of the second casing 43a. The portion 43c of the second casing 43a which is located directly below the axis O faces a lowermost part 40b of the output gear 40. As shown in FIG. 3, the gears 33, 34, 39, 40 disposed on the one side in the direction of the axis O overlap the abutting surfaces 43j in the direction of the axis O and protrude from the body second casing 43a. The gears 36, 37 disposed on the other side in the direction of the axis O are located on the other side in the direction of the axis O with respect to the abutting surfaces 43j, and the gears 36, 37 are accommodated in the body second casing 43a. In a modification, not shown, all of the gear described above may be accommodated in the body second casing 43a, or all of the gears described above may be accommodated in the body first casing 43g.

As shown in FIG. 1, the outer surface of the body first casing 43g has a plurality of protruding portions 43i. The protruding portions 43i are formed at intervals in the circumferential direction of the body first casing 43g and protrude from the outer surface of the body first casing 43g. Each protruding portion 43i is integrally coupled to the brim portion 43h and forms a part of the abutting surface 43j. Similarly, as shown in FIG. 2, the outer surface of the body second casing 43a has a plurality of protruding portions 43e. The protruding portions 43e are formed at intervals in the circumferential direction of the body second casing 43a, and the positions of the protruding portions 43e correspond to those of the plurality of protruding portions 43i. Each protruding portion 43e protrudes from the outer surface of the body second casing 43a. Each protruding portion 43e is integrally coupled to the brim portion 43d and forms a part of the abutting surface 43j.

The number of protruding portions 43i is the same as that of protruding portions 43e, and as shown in FIG. 3, the protruding portions 43i and the protruding portions 43e are paired with the abutting surfaces 43j therebetween. One protruding portion 43i has a through hole extending in the direction of the axis O. The other protruding portion 43e has a bottomed internally threaded hole extending in the direction of the axis O. A bolt 43k is passed through the protruding portion 43i, and an externally threaded part of the bolt 43k is screwed in the internally threaded hole of the protruding portion 43e. The protruding portions 43i, 43e of each pair are connected and fixed to each other by the bolt 43k serving as a connecting element. The body first casing 43g and the body second casing 43a are thus coupled to each other. The present invention is not limited to the above embodiment. The internally threaded hole into which the bolt 43k is screwed need only be formed in one of the protruding portion 43i and the protruding portion 43e, and the through hole through which the bolt 43k is passed need only be formed in the other protruding portion.

Next, the hub carrier 18 will be described in detail.

As shown in FIG. 3, the hub carrier 18 includes the arm portion 18b protruding in the form of an arm in a direction perpendicularly to the axis O from an end of the inner fixing member 13 which is located on the other side in the direction of the axis O. The arm portion 18b protrudes downward from the inner fixing member 13 and extends beyond the portion 43c of the body casing 43 which is located directly below the axis O (FIGS. 1, 4). The portion 43c located directly below the axis O is included in the body second casing 43a. The arm portion 18b changes its direction at its lower end 18c, which is a tip end of the arm portion 18b, from the direction perpendicular to the axis O to a direction toward the one side in the direction of the axis O, so that the lower end 18c extends in the direction toward the one side in the direction of the axis O and faces at an interval the outer surface of the portion 43c of the second body casing 43a which is located directly below the axis O. A socket member 18d having a socket surface 82s is attached and fixed to the lower end 18c. Such an attaching and fixing structure is not particularly limited. For example, a through hole is formed in the lower end 18c so as to extend therethrough in the vertical direction, and the socket member 18d is fitted in the through hole. The socket surface 82s of the ball joint 82 is a spherical recess that opens downward, and forms a connecting portion for rotatable connection to the lower arm 81.

The ball joint 82 is a universal joint including the socket surface 82s and a ball stud 82t and bendable in all directions. The ball joint 82 rotatably connects the hub carrier 18 and the lower arm 81. The socket surface 82s receives a spherical ball portion. As shown in FIGS. 1, 2, and 4, this ball portion is formed in an upper end region of the ball stud 82t. A lower end region of the ball stud 82t is in the shape of a shaft and is connected and fixed to an end 83 of the lower arm 81 which is located on the outer side in the lateral direction of the vehicle. The lower arm 81 is herein sometimes referred to as the vehicle body-side member as the lower arm 81 is attached to the vehicle body as viewed from an illustrated member that is herein the socket surface 82c.

As shown in FIG. 3, the ball stud 82t of the ball joint 82 is disposed such that the socket surface 82s does not overlap the abutting surfaces 43j in the direction of the axis O of the wheel hub bearing unit 11 and overlaps the body second casing 43a in the direction of the axis O. The socket surface 82s serving as the connecting portion is disposed similarly. Preferably, the socket member 18d is disposed such that the entire socket member 18d does not overlap the abutting surfaces 43j in the direction of the axis O.

As shown in FIGS. 1, 2, and 4, the protruding portions 43i, 43e are disposed so as not to overlap the socket member 18d serving as the connecting portion as viewed in the direction of the axis O of the wheel hub bearing unit 11. In other words, the socket member 18d and the lower end 18c are disposed between adjoining ones of the protruding portions 43i, 43i (or the protruding portions 43e, 43e).

As shown in FIGS. 1 and 2, the socket member 18d located at a lower position and the brim portions 43h, 43d located at a higher position are disposed so as to overlap each other as viewed in the direction of the axis O. As shown in FIG. 3, the socket member 18d is disposed so as not to overlap the abutting surfaces 43j and the brim portions 43h, 43d in the direction of the axis O_ The socket member 18d therefore does not interfere with the brim portions 43h, 43d.

According to the present embodiment, the hub carrier 18 has the arm portion 18b protruding in the form of an arm from the end of the inner fixing member 13 which is located on the other side in the direction of the axis O. The lower end 18c at the tip end of the arm portion 18b extends so as to face the outer wall surface of the body second casing 43a with a gap G1 therebetween. The lower end 18c has the socket surface 82s for rotatable connection to the lower arm 81 that is the vehicle body-side member. As shown in FIG. 3, the socket member 18d is disposed so as not to overlap the abutting surfaces 43j in the direction of the axis O of the wheel hub bearing unit 11 and so as to overlap the body second casing 43a in the direction of the axis O. Accordingly, the socket surface 82s can be located closer to the axis O, whereby sufficient space for the end 83 of the lower arm 81 which is located on the outer side in the lateral direction of the vehicle can be provided in the internal space region of the road wheel W. Alternatively, the radial dimension of the body casing 43 about the axis O can be increased, whereby the diameter of the output gear 40 can be made larger than in conventional examples and the reduction ratio can be increased accordingly. Specifically, the socket member 18d can be disposed so as to overlap the brim portion 43h as viewed in the direction of the axis O as shown in FIG. 1, the socket member 18d can be disposed so as to overlap the brim portion 43d as viewed in the direction of the axis O as shown in FIG. 2, and the gap G1 between the body second casing 43a and the socket member 18d can be reduced as shown in FIG. 3.

Figure 5:
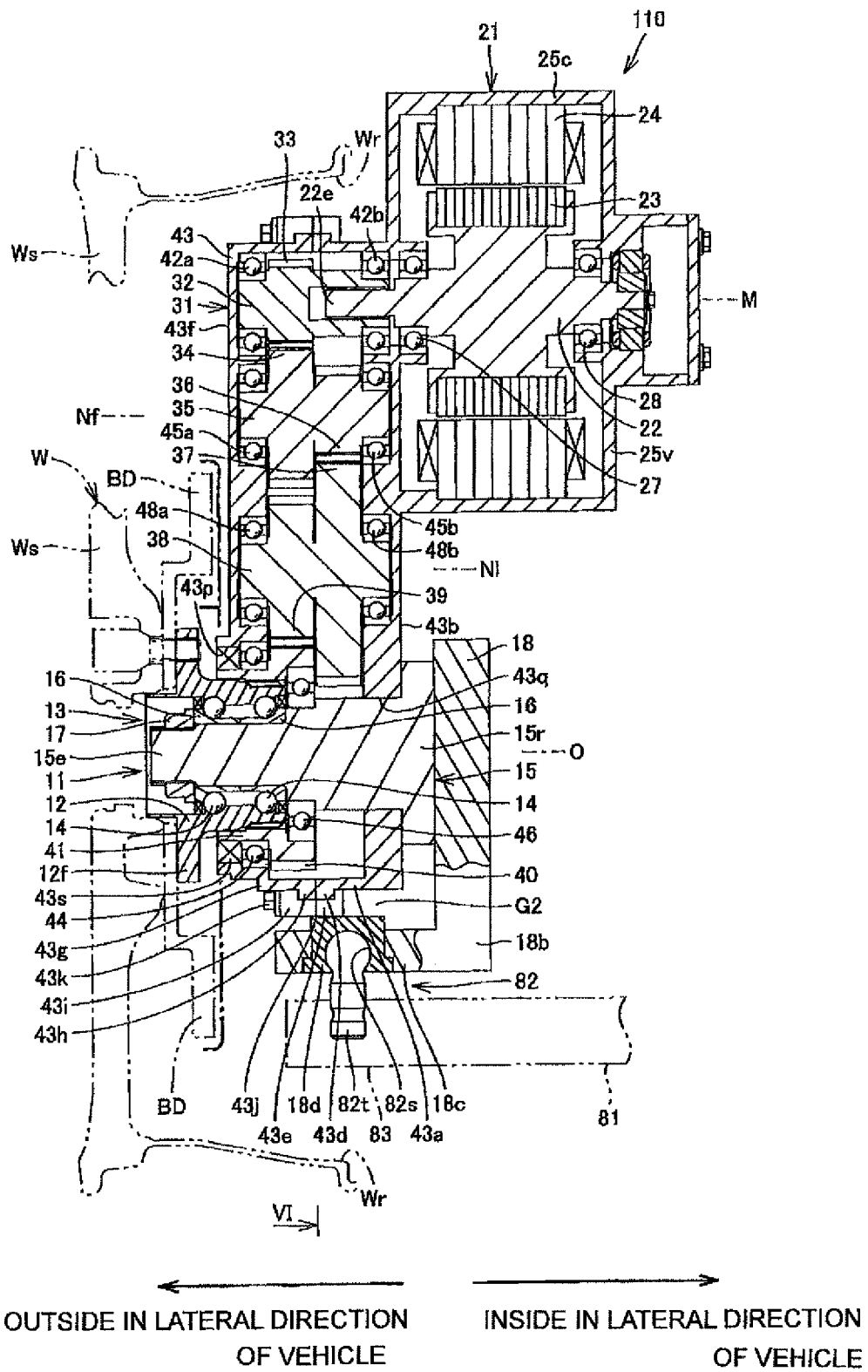
FIG. 5 is a developed section schematically showing an in-wheel motor drive device of Reference Example 1.
Figure 6:
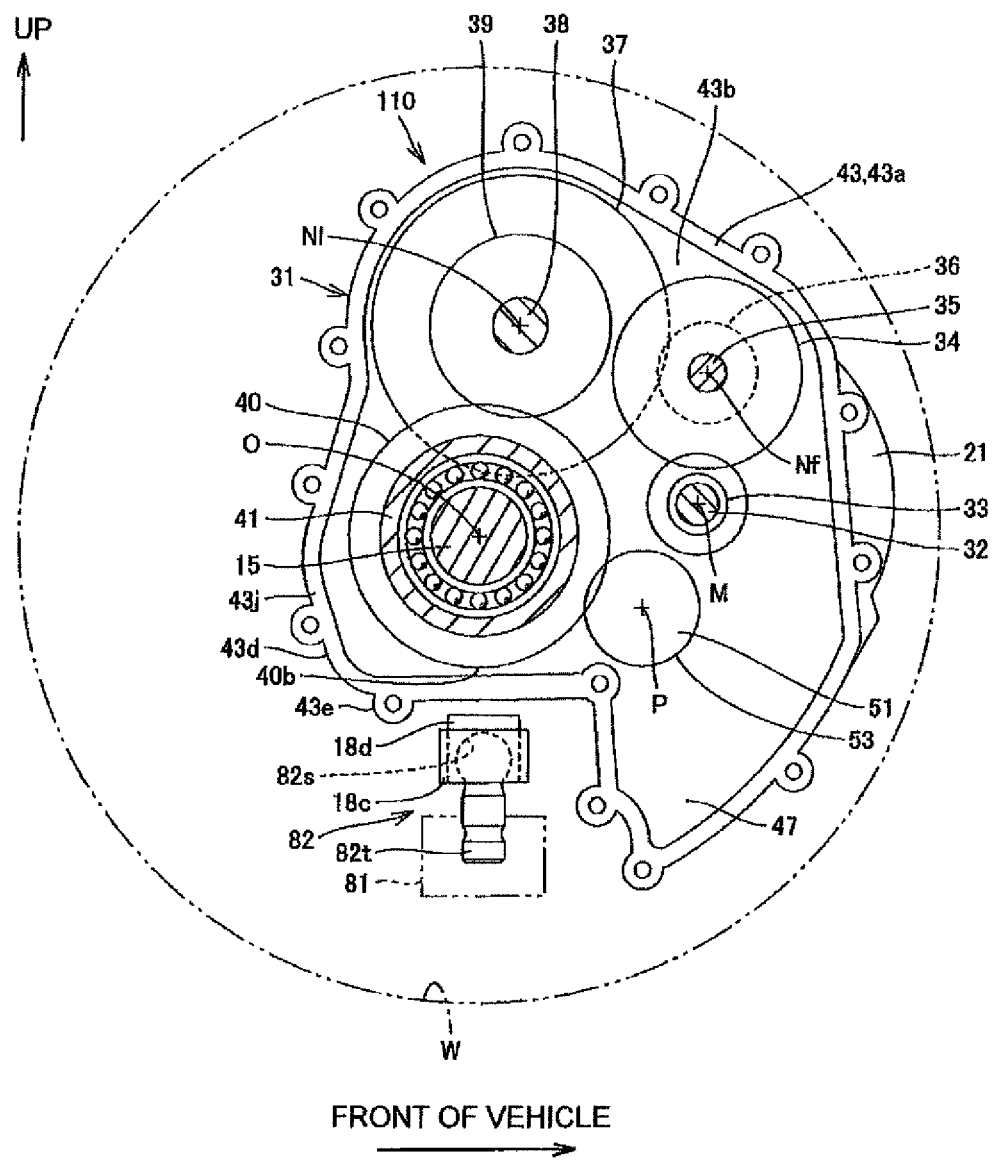
FIG. 6 is a transverse section schematically showing the in-wheel motor drive device of Reference Example 1.
Figure 7:
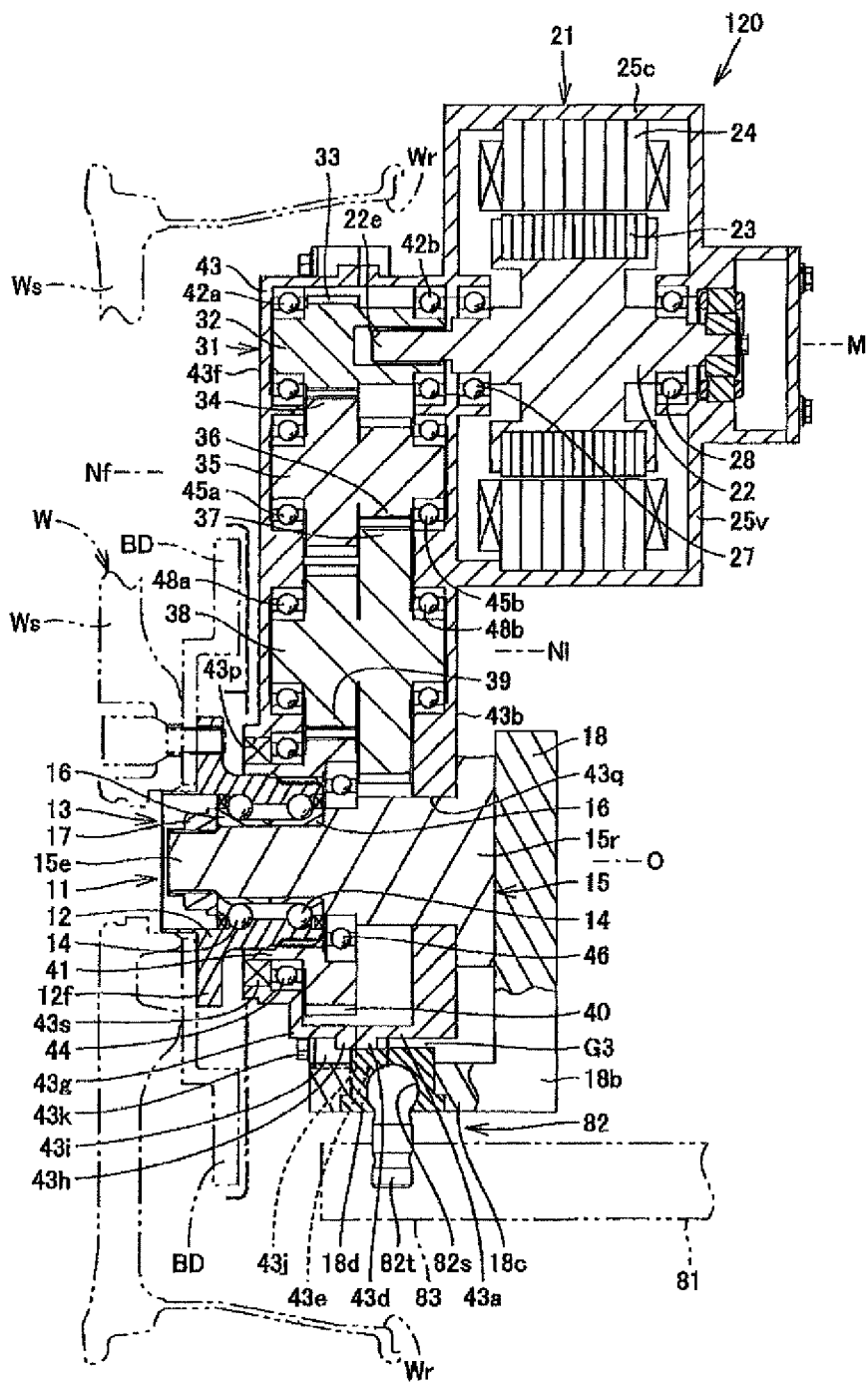
FIG. 7 is a developed section schematically showing an in-wheel motor drive device of Reference Example 2.

Reference Example 1 and Reference Example 2 will be described in order to facilitate understanding of the effects of the present embodiment. FIG. 5 is a developed section schematically showing an in-wheel motor drive device of Reference Example 1. FIG. 6 is a transverse section schematically showing the in-wheel motor drive device of Reference Example 1, taken along a plane shown by VI-VI in FIG. 5 and as viewed in the direction shown by an arrow. FIG. 7 is a developed section schematically showing an in-wheel motor drive device of Reference Example 2. For Reference Example 1 and Reference Example 2, the same configurations as those of the above embodiment are denoted with the same reference characters and description thereof will be omitted. Configurations different from the above embodiment will be described below. As shown in FIG. 5, in an in-wheel motor drive device 110 of Reference Example 1, the socket member 18d is disposed so as to overlap the abutting surfaces 43j in the direction of the axis O and to overlap the body second casing 43a in the direction of the axis O. A gap G2 between the body second casing 43a and the socket member 18d is therefore increased (G1<G2).

Alternatively, as shown in Reference Example 2 of FIG. 7, in an in-wheel motor drive device 120 of Reference Example 2 in which the socket member 18d is disposed so as to overlap the abutting surfaces 43j in the direction of the axis O and to overlap the body second casing 43a in the direction of the axis O, if a gap G3 between the body second casing 43a and the socket member 18d is made equal to that in the embodiment shown in FIG. 3 (G1=G3), the brim portions 43h, 43d interfere with the socket member 18d, and the lower end 18c of the arm portion 18b and the socket surface 82s cannot be appropriately disposed.

As is understood from comparison with Reference Example 1 and Reference Example 2 described above, the socket surface 82s can be located closer to the outer surface of the body casing 43 in the embodiment shown in FIG. 3.

According to the present embodiment, the wheel hub bearing unit 11 and the reduction gear unit 31 has the body casing 43 that is common to the wheel hub bearing unit 11 and the speed reduction unit 31. The reduction gear unit 31 is a parallel-shaft reduction gear serving as a reduction gear mechanism that reduces the speed of rotation of the motor unit 21 to transmit the resultant rotation to the outer ring 12. The reduction gear unit 31 includes the input gear 33 coupled to the motor rotary shaft 22 of the motor unit 21 and at least one intermediate gear (the intermediate gear 39 etc.) that transmits rotation from the input gear 33 to the output gear 40. The intermediate gear 39 is disposed radially outside the outer ring 12 and overlaps the outer ring 12 in the direction of the axis O. All of the gears 33, 34, 36, 37, 39 are disposed radially outside the outer ring 12. The body second casing 43a surrounds the output gear 40 coupled to the outer ring 12. In the in-wheel motor drive device 10 including a parallel-shaft reduction gear, the radial gap between the body casing 43 and the socket member 18d can thus be reduced and the dimension of the in-wheel motor drive device 10 in the direction of the axis O can further be reduced.

According to the present embodiment, the hub carrier 18 and the vehicle body-side member are coupled via the ball joint 82 that is bendable in all directions. That is, the socket surface 82s of the ball joint 82 is a connecting portion for connection to the vehicle body-side member. The socket member 18d is a connecting member for connection to the vehicle body-side member. The in-wheel motor drive device 10 can thus be steered in the lateral direction of the vehicle with the ball joint 82 serving as the center of rotation and can swing in the vertical direction.

According to the present embodiment, the first brim portion 43h protruding outward is formed at the end of the body first casing 43g which is located on the other side in the direction of the axis O, and the second brim portion 43d protruding outward is formed at the end of the body second casing 43a which is located on the one side in the direction of the axis O. The brim portion 43h and the brim portion 43d abut on each other in the direction of the axis O. The abutting surface 43j is thus also formed on the brim portion 43h and the brim portion 43d, whereby wide abutting surfaces can be provided. Sealing performance of the abutting surfaces 43j is therefore improved.

According to the present embodiment, as shown in FIG. 3, the socket member 18d does not overlap the brim portion 43h and the brim portion 43d in the direction of the axis O of the wheel hub bearing unit 11. As shown in FIGS. 1 and 2, the socket member 18d is disposed so as to overlap the brim portion 43h and the brim portion 43d as viewed in the direction of the axis O. Accordingly, even though the brim portions 43h, 43d are formed to provide the wide abutting surfaces 43j, the gap G1 between the socket member 18d and the outer wall surface of the body casing 43 can be reduced and sufficient space can be provided between the socket member 18d and the rim portion Wr. The gap G1 is a gap that opens in the direction perpendicular to the axis O and is also a gap that opens in the radial direction and the vertical direction.

According to the present embodiment, the outer wall surface of the body first casing 43g has the protruding portions 43i, and the outer wall surface of the body second casing 43a has the protruding portions 43e. These protruding portions 43i, 43e are paired with the abutting surfaces 43j therebetween. The protruding portions 43i, 43e of each pair are connected and fixed to each other by the bolt 43k serving as a connecting element. As shown in FIGS. 1 and 2, the protruding portions 43i, 43e are disposed so as not to overlap the socket member 18d as viewed in the direction of the axis O of the wheel hub bearing unit 11. Accordingly, even though the protruding portions 43i, 43e are formed on the outer wall surface of the body casing 43, the gap G1 between the socket member 18d and the outer wall surface of the body casing 43 can be made smaller than in conventional examples and sufficient space can be provided between the socket member 18d and the rim portion Wr.

According to the present embodiment, as shown in FIG. 3, the protruding portions are offset in the direction of the axis O of the wheel hub bearing unit 11 so as not to overlap the socket member 18d in the direction of the axis O. The brim portions 43h, 43d are also offset in the direction of the axis O so as not to overlap the socket member 18d in the direction of the axis O.

As shown in FIG. 3, the present embodiment includes the in-wheel motor drive device 10 and the road wheel W having the rim portion Wr and the spoke portion Ws with the central part of the spoke portion Ws being connected and fixed to the outer ring 12. At least a part of the socket member 18d is disposed in the internal space region of the road wheel W which is defined by the rim portion Wr and the spoke portion Ws. At least a part of the socket surface 82s can thus be disposed in the internal space region of the road wheel W, and the steering axis extending in the vertical direction and crossing the ball joint 82 can be located closer to the wheel center of the wheel, whereby steering stability of the wheel is improved.

Although the embodiment of the present invention is described above with reference to the figures, the present invention is not limited to the illustrated embodiment. Various changes and modifications can be made to the illustrated embodiment without departing from the spirit and scope of the invention.

INDUSTRIAL APPLICABILITY

The in-wheel motor drive device of the present invention is advantageously used in electric vehicles and hybrid vehicles.

REFERENCE SIGNS LIST

10: In-Wheel Motor Drive Device, 11: Wheel Hub Bearing Unit, 12: Outer Ring, 13: Inner Fixing Member, 15: Fixed Shaft, 18: Hub Carrier, 18b: Arm Portion, 18c: Lower End, 18d: Socket Member (Connecting Member), 21: Motor Unit, 31: Reduction Gear Unit, 32: Input Shaft, 33: Input Gear, 34, 36, 37, 39: Intermediate Gear, 35, 38: Intermediate Shaft, 40: Output Gear, 41: Output Shaft, 43: Body Casing, 43a: Body Second Casing, 43b: Back Portion, 43c: Portion Directly Under Axis O, 43d: Second Brim Portion, 43e, 43i: Protruding Portion, 43f: Front Portion, 43g: Body First Casing, 43h: First Brim Portion, 43j: Abutting Surface, 43k: Bolt (Connecting Element), 43p, 43q: Opening, 47: Oil Tank, 81: Lower Arm (Vehicle Body-Side Member), 82: Ball Joint, 82s: Socket Surface (Connecting Portion), 82t: Ball Stud, G1, G2, G3: Gap, M, Nf, Nl, O, P: Axis, W: Road Wheel, Wr: Rim Portion, Ws: Spoke Portion.

The invention claimed is:

1. An in-wheel motor drive device, comprising:
a wheel hub bearing unit having an outer ring that rotates with a wheel, an inner fixing member disposed inside the outer ring, and a plurality of rolling elements disposed in annular clearance between the outer ring and the inner fixing member; a motor unit that drives the outer ring; and a hub carrier coupled to the inner fixing member, wherein
a casing accommodating a drive transmission path from the motor unit to the outer ring includes a tubular body first casing disposed on one side in an axial direction of the wheel hub bearing unit and a tubular body second casing disposed on the other side in the axial direction of the wheel hub bearing unit,
each of the body first casing and the body second casing has an annular abutting surface so that the annular abutting surfaces of the body first casing and the body second casing abut on each other in the axial direction,
the hub carrier extends so as to protrude in a form of an arm from an end of the inner fixing member which is located on the other side in the axial direction and to face at an interval an outer wall surface of the body second casing, and has at its tip end a connecting portion for rotatable connection to a vehicle body-side member, and
the connecting portion is disposed so as not to overlap the abutting surfaces in the axial direction of the wheel hub bearing unit and so as to overlap the body first casing or the body second casing in the axial direction of the wheel hub bearing unit.

2. The in-wheel motor drive device according to claim 1, wherein
the body first casing and/or the body second casing surrounds a gear coupled to the outer ring.

3. The in-wheel motor drive device according to claim 1, wherein
the connecting portion is a ball joint.

4. The in-wheel motor drive device according to claim 1, wherein
a first brim portion protruding outward is formed at an end of the body first casing which is located on the other side in the axial direction, a second brim portion protruding outward is formed at an end of the body second casing which is located on the one side in the axial direction, and the first brim portion and the second brim portion abut on each other in the axial direction.

5. The in-wheel motor drive device according to claim 4, wherein the connecting portion does not overlap the first brim portion and the second brim portion in the axial direction of the wheel hub bearing unit, and the connecting portion is disposed so as to overlap the first brim portion and the second brim portion as viewed in the axial direction of the wheel hub bearing unit.

6. The in-wheel motor drive device according to claim 1, wherein protruding portions are formed on an outer wall surface of the body first casing and the outer wall surface of the body second casing, and the protruding portions are paired with the abutting surfaces therebetween, the protruding portions of each pair are connected and fixed to each other by a connecting element, and the protruding portions are disposed so as not to overlap the connecting portion as viewed in the axial direction of the wheel hub bearing unit.

7. The in-wheel motor drive device according to claim 6, wherein the protruding portions are offset in the axial direction of the wheel hub bearing unit so as not to overlap the connecting portion in the axial direction of the wheel hub bearing unit.

8. A connection structure between an in-wheel motor drive device and a wheel, comprising:

the in-wheel motor drive device according to claim 1; and a wheel having a rim portion and a spoke portion with a central part of the spoke portion being connected and fixed to the outer ring, wherein at least a part of the connecting portion is accommodated in an internal space region of the wheel which is defined by the rim portion and the spoke portion.

* * * * *